United States Patent [19]
Trombley

[11] 4,194,815
[45] Mar. 25, 1980

[54] SEMI-SCLERAL CONTACT LENS

[75] Inventor: Wayne E. Trombley, Midland, Mich.

[73] Assignee: Dow Corning Corporation, Midland, Mich.

[21] Appl. No.: 919,651

[22] Filed: Jun. 28, 1978

[51] Int. Cl.$^2$ ............................................... G02C 7/04
[52] U.S. Cl. .................................. 351/160 R; 351/177
[58] Field of Search ......................... 351/160 R, 160 H

[56] References Cited
U.S. PATENT DOCUMENTS

| Re. 29,229 | 5/1977 | Girard et al. | 351/160 |
|---|---|---|---|
| 1,921,972 | 8/1933 | Fertsch et al. | 351/160 |
| 3,482,906 | 12/1969 | Volk | 351/160 R |
| 3,937,566 | 2/1976 | Townsley | 351/160 X |

FOREIGN PATENT DOCUMENTS 663765  5/1963  Canada ...................................... 351/160

OTHER PUBLICATIONS

Fainbloom, et al.; "Fitting Ellipsoidal Contact Lenses,"; Contacto, vol. 16, No. 1, Mar. 1972, pp. 36–38.

*Primary Examiner*—John K. Corbin
*Assistant Examiner*—Scott J. Sugarman
*Attorney, Agent, or Firm*—Max J. Kenemore

[57] ABSTRACT

The inner surface of a semi-scleral contact lens is shaped relative to the topography of an individual eyeball to achieve central contact and edge contact with tearfilm clearance therebetween. The lens has improved centering properties. The lens includes an optical zone which is the spherical equivalent of the radius of curvature of the cornea at its optical centerline and the corneal dimensional diameter. The optical zone has a sagittal depth which is dependent on the topography of the cornea. The lens also includes a conoid section which is tangent to the edge of the optical zone and which extends from the edge of the optical zone to a selected point over the limbus. A peripheral curve having an individual radius of curvature extends from the selected point to the edge of the lens.

12 Claims, 1 Drawing Figure

SEMI-SCLERAL CONTACT LENS

BACKGROUND OF THE INVENTION

1. Field of the Invention

This invention relates generally to vision correction by spectacles and eyeglasses and more specifically to eye contact type ophthalmic lenses.

2. Description of the Prior Art

Scleral and semi-scleral contact lenses have long been known in the art. Scleral lenses which are supported by the sclera and which arch over the cornea are described, for example, in U.S. Pat. Nos. 2,129,305; 2,129,304; 2,178,873; 2,196,066; and 2,438,743 to Feinbloom; U.S. Pat. No. 2,330,837 to Mullen; and U.S. Pat. Nos. 3,781,096 and 3,937,566 to Townsley.

Scleral lenses have not been in popular use recently. Their design does not normally allow for movement of the lens on the eye, and it is now known that some such movement is desirable. Scleral lenses are usually made of an oxygen impermeable material and thus block the supply of atmospheric oxygen to a large area of the eye.

Fertsch et al disclose in U.S. Pat. No. 1,921,972 a scleral lens having its inner surface formed from two spherical sections, each section having a different radius of curvature and spherical center. The sharp edge where the two sections meet is smoothed by forming a third spherical cut which can have an infinite radius of curvature, i.e., a conical section. The use of a conical section between the two spherical sections of a scleral lens, as taught by Fertsch, does not take into recognition the topography of the individual eyeball and does not result in central and edge contact with tearfilm clearance therebetween or in ready tearfilm exchange with blinking.

Flush-fitting semi-scleral lenses which are in total contact with the cornea are described in U.S. Pat. No. Re. 29,229 to Girard et al.

Girard et al also discloses a semi-scleral lens which arches over the cornea. Girard et al does not disclose a semi-scleral lens which is shaped relative to the topography of an individual eyeball. Such semi-scleral lenses, like corneal lenses, often are given to excessive movement on the eye due to gravity and eyelid drag. Such movement is commonly referred to as lag and causes variable vision upon blinking. Such variable vision can be distracting when it is excessive.

Tuohy indicates in U.S. Pat. No. 2,510,438 that contact lenses have been produced which have portions resting directly on the cornea and a supporting flange or border resting on the scleral portion of the eye. Tuohy points out that such lenses are difficult to fit accurately and that the flange may seal off the corneal area from the flow of eye fluids. Touhy's solution to the problem is a corneal lens which contacts the central cornea and which has a slightly raised marginal portion. A semi-scleral contact lens which is easy to fit and which does not seal off the corneal area from the flow of eye fluids is desirable.

Semi-scleral contact lens have been made from relatively rigid materials such as polymethylmethacrylate (PMMA) in shapes which do not take into account the topography of the individual eye. Such lenses have exhibited some usefulness although they are subject to the disadvantages pointed out by Touhy.

The semi-scleral lens design used with relatively rigid materials cannot normally be used with certain resilient materials such as silicone rubbers, hydratable gels and hydroxyethylmethacrylate (HEMA). Silicone rubbers are especially desirable lens materials because of their oxygen permeability and their bio-compatibility. When the semi-scleral hard lens design is used with such resilient materials, the blinking action of the eyelid sometimes causes the lens to suction to the eyeball. A design which will enable resilient materials such as silicone rubbers to be used as semi-scleral lenses is desirable.

SUMMARY OF THE INVENTION

It is, therefore, a primary object of the invention to shape the inner surface of a semi-scleral contact lens relative to the topography of an individual eyeball.

It is another object of the invention to shape the inner surface of a semi-scleral contact lens so that there is central and edge contact between the lens and the eye with tearfilm clearance therebetween.

It is still another object of the present invention to shape the inner surface of a semi-scleral contact lens so that there is tear exchange with blinking.

It is also an object of the present invention to achieve improved centering of the contact lens.

It is yet a further object of the present invention to shape the inner surface of a silicone elastomer contact lens so that it is useful as a semi-scleral contact lens.

It is also an object of the present invention to overcome the disadvantages of the prior art.

These and other objects are accomplished by the present invention which comprises, generally speaking, a semi-scleral contact lens having an interior surface shaped relative to the topography of an individual eyeball so that there is central contact and edge contact. Tearfilm clearance exists between the areas of contact, and tear exchange occurs with blinking. The lens includes an optical zone which is the spherical equivalent of the radius of curvature (k) of the cornea at its optical centerline and the corneal dimensional diameter (y).

The optical zone has a sagittal depth described by the formula $$S_{0z} = a - \sqrt{a^2 - \frac{y^2}{Sf}}.$$

wherein $a$ is $k/Sf$, $Sf$ is $1-E^2$ and $E$ is the degree of eccentricity of the elipse described by the cornea.

The optical zone has a radius of curvature described for the formula $$R_{0z} = \frac{\frac{y^2}{S_{0z}} + S_{0z}}{2}$$

A conical section lies between the circumference of the optical zone and a selected point over the limbus. The conical section is tangent to the optical zone at its circumference.

A curved peripheral section lies between the selected point and the edge of the lens. The peripheral section has a radius of curvature which is perpendicular to the conoid section at the selected point and which extends from the selected point to the optical centerline of the cornea.

BRIEF DESCRIPTION OF THE DRAWING

The invention will now be described with reference to the drawing in which.

DETAILED DESCRIPTION

Figure 1:
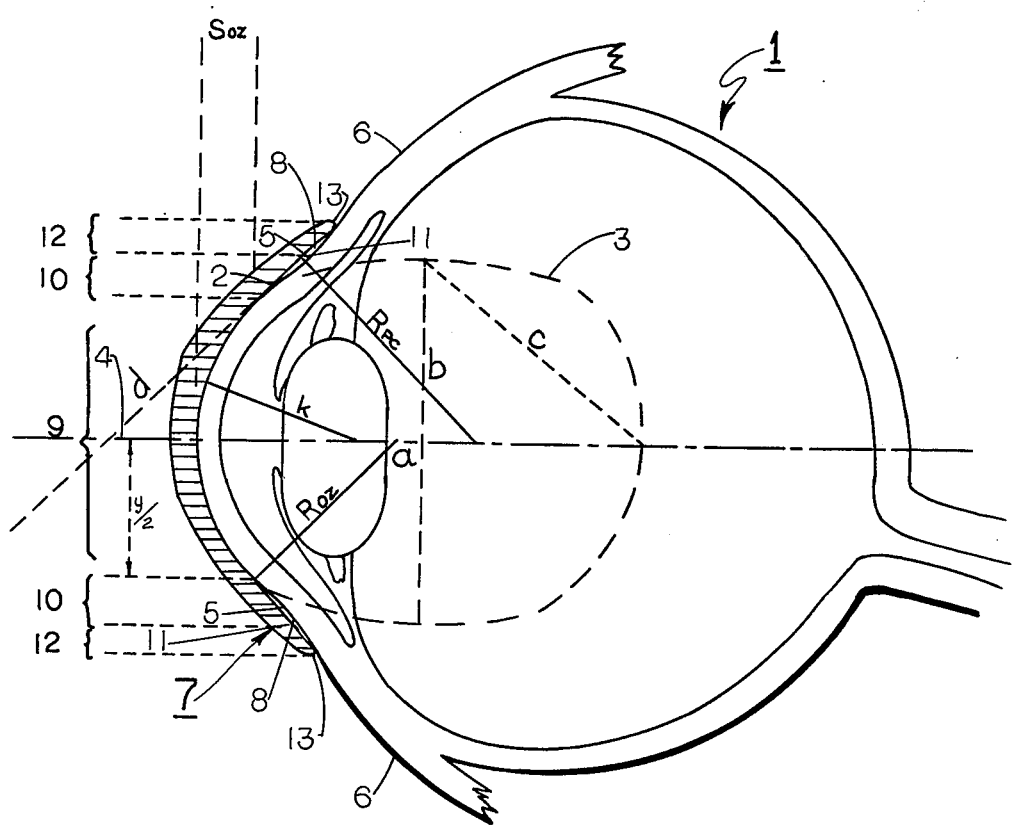
FIG. 1 shows schematically and in cross-section a model of the human eye having the semi-scleral contact lens of the present invention in position thereon.

Referring more specifically to FIG. 1 there is shown on eyeball 1 indications of the measurements which can be made of the topography of the individual eyeball.

Cornea 2 defines an arc of elipse 3. Cornea 2 has a radius of curvature k at optical centerline 4.

It is observed from numerous samplings that the eccentricity of ellipse 3 defined by most human corneas 2 varies from about 0.2 to about 0.7, although it can be both more and less. The average eccentricity is about 0.5. The eccentricity of corneal ellipse 3 may be determined by the ratio c/a. In normal practice the corneal eccentricity is determined using a photokeratoscope.

The corneal dimensional diameter y is casually considered to coincide with the visible iris. More exact measurement of the corneal dimensional diameter can be made with an opthalomometer, as is well known in the art. The corneal dimensional diameter is found to range from about 9.0 mm to about 11.0 mm in most human eyes.

Limbus 5 is an area of the eye where the more spherical portion of the eyeball meets the elliptical cornea. Limbus 5 is known to have a high concentration of nerves. It is very sensitive to touch or to contact with a lens material.

The diameter of the human limbus varies from eye to eye as is true of the other dimensions of the eye. The average diameter of the limbus is observed to be about 11.65 mm.

Sclera 6 is the white part of the eyeball and is less sensitive to the touch than limbus 5.

Semi-scleral contact lens 7 is shown to cover cornea 2, limbus 5 and a small portion of sclera 6. Lens 7 shows central contact with cornea 2, edge contact with sclera 6 and creates tearfilm clearance 8 therebetween. The lens is observed to exhibit a desirable relative motion with respect to the eyeball and to provide tear exchange with blinking.

It is well understood in the contact lens arts that "contact" between a lens and an eyeball contemplates a capillary layer of tears between the lens and the eyeball surface. Such a capillary layer is contrasted with a tearfilm layer such as that in tearfilm clearance 8. A tearfilm layer is often sufficiently thick to provide optical correction in addition to correction provided by the lens.

Lens 7 can be made from any useful material. Suitable materials include glass; hard resins such as PMMA or the silicone resin described in copending application Ser. No. 905,626; filed May 15, 1978; and resilient materials such as silicone rubbers, HEMA, and hydratable gels. Glass is seldom used in recent years for contact lenses because of its brittleness. PMMA is extensively used in contact lenses because of its thoughness and because it can be made wettable.

A preferred material for lens 7 is silicone rubber. Silicone rubbers are generally siloxane elastomers filled with activated silica. The use of such rubbers as materials for corneal contact lenses is described in greater detail in U.S. Pat. No. 3,228,741 to Becker. Such silicone rubbers are preferred for the lenses of this invention primarily because of their oxygen permeability and because their resilient nature aids in tear exchange with blinking.

Lens 7 has an inner surface which is formed to take into consideration the topography of eyeball 1. Optical zone 9 is the spherical equivalent of the radius of curvature (k) and the corneal dimensional diameter (y).

Optical zone 9 is formed to have a sagittal depth ($S_{0z}$) which is calculated by the formula $$S_{0z} = a - \sqrt{a^2 - \frac{y^2}{Sf}}$$

wherein a is k/Sf, Sf is 1-$E^2$ and E is the degree of eccentricity of the ellipse defined by the cornea (c/a).

The radius of curvature ($R_{Oz}$) of optical zone 9 is calculated by the formula $$R_{0z} = \frac{\frac{y^2}{S_{0z}} + S_{0z}}{2}$$

Conic section 10 extends from the circumference of the optical zone to a selected point 11 over sclera 6. Conic section 10 is defined by a line tangent to the optical zone at its circumference. The tangent is shown by line d in the drawing.

Conic section 10 bridges limbus 5 and avoids contact by lens 7 with that highly sensitive area. Selected point 11 can be any point which enables lens 7 to bridge limbus 5. The midline diameter of the individual limbus 5 may be measured and used as selected point 11. However, it has been observed that the average midline diameter for the human limbus 5 is about 11.65 mm. This number can be used for selected point 11 to achieve tearfilm clearance 8 in most cases.

Peripheral curve 12 extends from selected point 11 to the edge 13 of lens 7. Peripheral curve 12 has a radius of curvature ($R_{pc}$) which is perpendicular to tangent line d at selected point 11 and which extends from point 11 to optical centerline 4.

Such a peripheral curve 12 brings lens 7 into contact with sclera 6 at edge 13 while maintaining tearfilm clearance 8.

Lens 7 may have any useful diameter, the exact diameter not being a critical dimension. Generally the diameter should be large enough to bridge limbus 5 but small enough to qualify as a semi-scleral lens. Semi-scleral lenses generally range from about 13 to about 17 mm in diameter. At such lens diameters, the peripheral curve formed as described above will be sufficiently shallow that no unshaped lens material will contact the eye.

The sagittal depth of the total lens is calculable and depends on the lens diameter. Like the lens diameter, the total sagittal depth is not critical to the invention although it may be readily calculated.

The outer surface of lens 7 can be of any useful configuration depending on the type of machining or molding used to form the lens and upon the type of vision correction required. Typically the outer surface of the lens is lenticular. That is, the outer surface is formed from concentric curves having the same optical centerline.

Contact lenses according to the present invention can be formed by any of the well known molding or machining techniques using readily obtainable measurements. For example, the corneal radius of curvature, corneal dimensional diameter and the corneal eccentricity can be observed. The limbus diameter can be measured and the lens diameter selected.

These measurements can be used along with the calculations described above to machine a lens from glass or a hard plastic. Alternatively, the measurements and calculations can be used to machine the convex portion of a mold set for making a lens from a resilient material.

The invention will now be described by way of Example.

EXAMPLE 1

A subject is chosen for fitting of semi-scleral contact lenses according to the present invention. The dimensional diameter of the cornea (y) or the subject's eye is measured using an opthalomometer and the corneal radius of curvature (k) is observed to be 7.80 mm. The degree of eccentricity of the cornea is determined using a photokeratoscope and is found to be 0.5.

The optical zone is determined by calculating the sagittal depth ($S_{0z}$) and the radius of curvature ($R_{02}$) thereof as follows:

$$S_{0z} = a - \sqrt{a^2 - \frac{y^2}{Sf}}$$

$$S_{0z} = 10.4 - \sqrt{108.16 - \frac{28.09}{.75}}$$

$$S_{0z} = 10.4 - 8.41$$

$$S_{0z} = 1.99 \text{ mm}$$

and $$R_{0z} = \frac{\frac{y^2}{S_{0z}} + S_{0z}}{2}$$

$$R_{0z} = \frac{\frac{28.09}{1.99} + 1.99}{2}$$

$$R_{0z} = 8.05 \text{ mm}.$$

The convex jig of a 14 mm diameter contact lens mold is turned on a Hardinge Model No. HSL59 lathe according to the calculations above. That is, the optical zone at the center of the jig is turned on a 8.05 mm radius of curvature to a depth of 1.99 mm.

Beginning at the circumference of the optical zone, the lathe is translated along a line tangent to the optical zone at the circumference. The translation is continued to a dimensional distance of 5.825 mm from the center of the eye. A conical section is thus formed on the jig from the edge of the optical zone to the 5.825 mm half chord.

A peripheral curve is cut in the jig from the 5.825 mm radius to the edge of the jig. The radius of curvature of the peripheral curve is perpendicular to the conical section at the 5.825 mm radius. The peripheral curve is accomplished by swinging the cutting head of the lathe in an arc passing through the resultant radius and having as its center the optical centerline of the lens. The concave jig is ground to provide vision correction in the optical zone.

A quantity of less than 1 gram of a primarily dimethyl polysiloxane fluid elastomer available from Dow Corning, is placed in the concave jig. The convex jig is positioned against the concave jig and a pressure is applied. The pressure is maintained while the fluid is cured for about 15 min. at about 150° C.

The lens is subjected to an ion plasma in a high humidity atmosphere to make its surface hydrophilic. It is then sterilized in a steam autoclave and made ready for patient dispensing.

The lens is observed to provide improved vision with good comfort.

Fluoroscein in ultraviolet light is used to observe the action of the lens on the eye and the tearfilm. The lens is observed to move relative to the eye but to center quickly upon blinking. The lens is observed to exhibit central and edge contact with tearfilm clearance therebetween. Tear exchange is observed with blinking.

EXAMPLE 2

A glasflex PMMA button suitable for contact lens grinding is obtained from Electroglas, Inc. (Stirling, N.J.) and the inside curve of the lens is ground according to the eye dimensions observed on the subject of Example 1. That is, the inside curve optical zone is ground to a depth of 1.99 mm with a radius of curvature of 8.05 mm. The turning is done on a Levin lathe.

The conic section of the PMMA lens is cut by translating the cutting head from the edge of the optical zone to a half chord of 5.825 mm along a line tangent to the optical zone at its circumference.

A peripheral curve is cut in the lens from the 5.825 mm half chord to its edge (14 mm) by moving the cutting head in an arc having the optical center line of the lens as its center and being perpendicular to the conic section at the 5.825 mm half chord.

The outer surface of the lens is finished to give the required optical correction.

The lens is sterilized and wetted with Liquifilm contact lens wetting solution, a commercially available wetting solution produced by Allergan Pharmaceuticals (Irvine, CA).

The lens is placed in the subject's eye and is observed to perform substantially the same as the resilient lens of Example 1 except with slightly less comfort. Correction of the subject's astigmatism is reported to be better with the PMMA lens.

The present invention has been disclosed in the above teachings, drawings and examples with sufficient clarity and conciseness to enable one skilled in the art to make and use the invention, to know the best mode for carrying out the invention and to distinguish it from other inventions and from what is old. Many variations and obvious adaptations of the inventions will readily come to mind, and these are intended to be contained within the scope of the invention as claimed below.

That which is claimed is:

1. A semi-scleral contact lens having an interior surface shaped relative to the topography of an individual eyeball so that the lens exhibits central contact and edge contact with tearfilm clearance therebetween and tear exchange with blinking, the lens comprising:

(a) an optical zone which is the spherical equivalent of the radius of curvature (k) of the cornea at its optical centerline and the corneal dimensional diameter (y), the optical zone having a sagittal depth described by the formula $$S_{0z} = a - \sqrt{a^2 - \frac{y^2}{Sf}}$$

where a is k/Sf, Sf is 1-$E^2$, and E is the degree of eccentricity of the ellipse described by the cornea, and the optical zone having a radius of curvature described by the formula $$R_{0z} = \frac{\frac{Y^2}{S_{0z}} + S_{0z}}{2};$$

(b) a conic section between the circumference of the optical zone and a selected point over the limbus, the conoid being tangent to the optical zone at its circumference; and
(c) a curved peripheral section between the selected point and the edge of the lens, the peripheral section having a radius of curvature which is perpendicular to the conoid section at the selected point and which extends from the selected point to the optical centerline of the cornea.

2. The lens of claim 1 wherein the outer surface is lenticular.
3. The lens of claim 1 wherein the lens is formed from a resilient material.
4. The lens of claim 3 wherein the resilient material is a silicone rubber.
5. The lens of claim 1 wherein the radius of curvature of the cornea (k) is between about 7.4 mm and about 8.4 mm.
6. The lens of claim 1 wherein the corneal dimensional diameter (y) is from about 9 mm to about 11 mm.
7. The lens of claim 1 wherein the selected point defines a circle having a diameter of about 11.65 mm.
8. The lens of claim 1 wherein the lens diameter is from about 13 to about 17 mm.
9. The lens of claim 1 wherein the eccentricity of the eye is from about 0.2 to about 0.7.
10. A method for shaping the interior surface of a semi-scleral contact lens relative to the topography of an individual eyeball so that the lens exhibits central contact and edge contact with tearfilm clearance therebetween and tearfilm exchange with blinking, the method comprising:
(a) forming an optical zone which is the spherical equivalent of the radius of curvature (k) of the cornea at its optical centerline and the corneal diameter (y), the optical zone having a sagittal depth described by the formula $$S_{0z} = a - \sqrt{a^2 - \frac{y^2}{Sf}}$$

where a is k/Sf, Sf is 1-E$^2$, and E is the degree of eccentricity of the ellipse described by the cornea, and the optical zone having a radius of curvature described by the formula $$R_{0z} = \frac{\frac{y^2}{S_{0z}} + S^{0z}}{2};$$

(b) forming a conic section between the circumference of the optical zone and a selected point over the limbus, the conoid being tangent to the optical zone at its circumference; and
(c) forming a peripheral curve between the selected point and the edge of the lens, the peripheral curve having a radius of curvature which is perpendicular to the conoid section at the selected point, and which extends from the selected point to the optical centerline of the cornea.
11. The method of claim 10 wherein the shape of the interior surface of the lens is incorporated into a mold and wherein the lens is formed using the mold.
12. The method of claim 10 wherein the interior surface of the lens is formed by machining.

* * * * *

Disclaimer 4,194,815.—*Wayne E. Trombley*, Midland, Mich. SEMI-SCLERAL CONTACT LENS. Patent dated Mar. 25, 1980. Disclaimer filed July 28, 1983, by the assignee, *Dow Corning Corp.*

Hereby enters this disclaimer to all claims of said patent.

[*Official Gazette September 13, 1983.*]